UNITED STATES PATENT OFFICE.

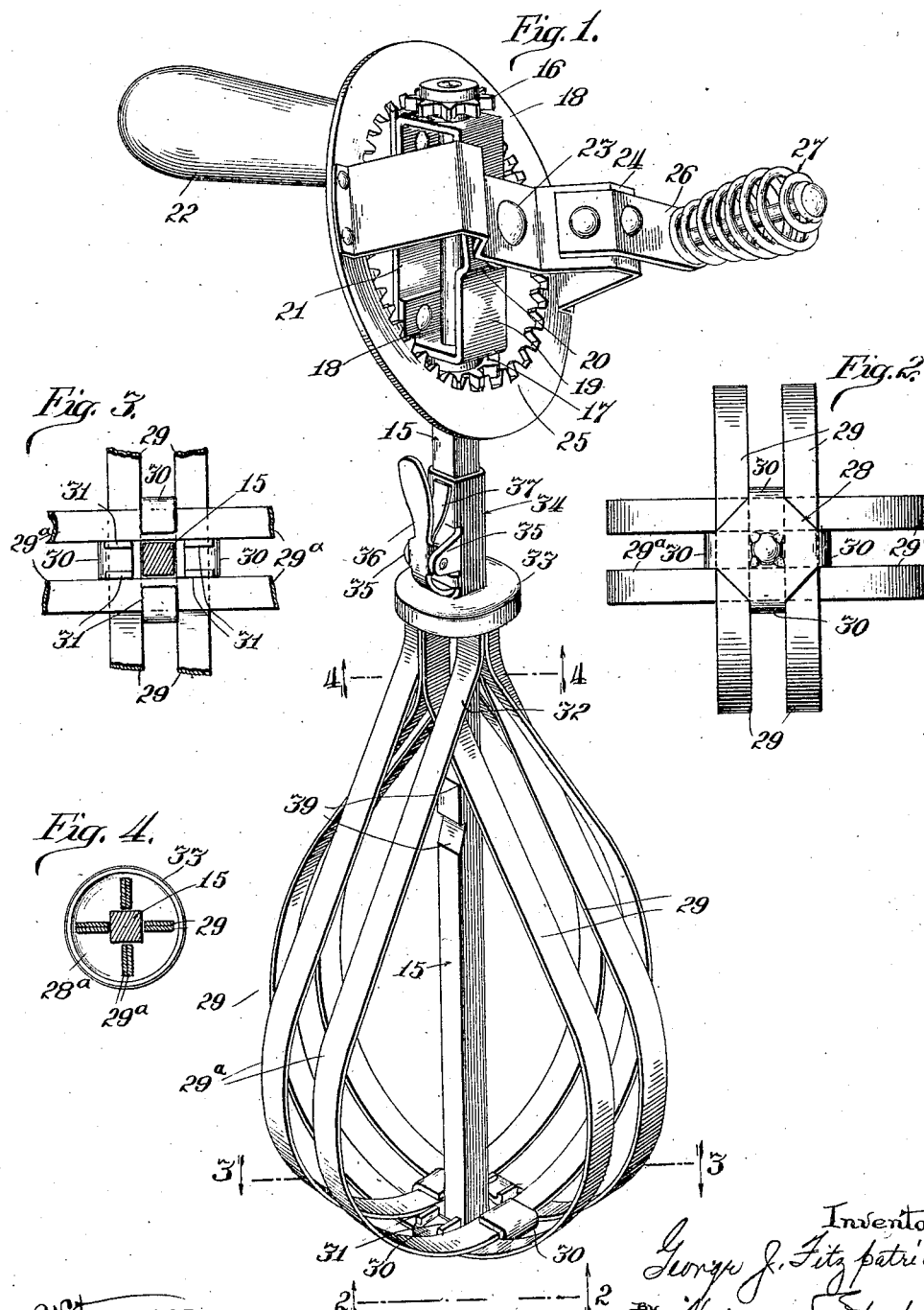

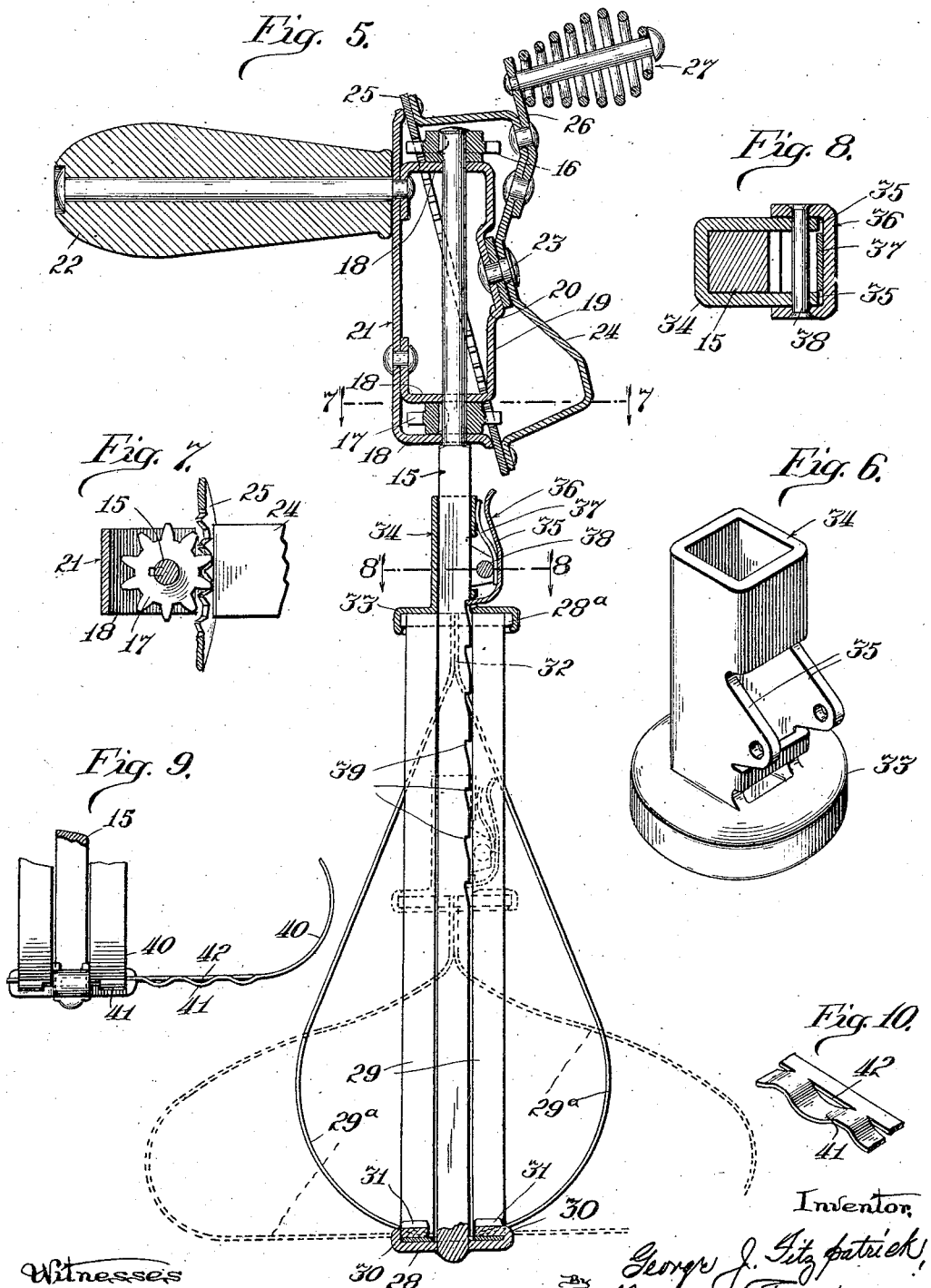

GEORGE J. FITZPATRICK, OF CHICAGO, ILLINOIS.

BEATER.

1,417,982.  Specification of Letters Patent.  Patented May 30, 1922.

Application filed May 26, 1921. Serial No. 472,716.

*To all whom it may concern:*

Be it known that I, GEORGE J. FITZPATRICK, a citizen of the United States, and a resident of Chicago, in the county of Cook and State of Illinois, have invented certain new and useful Improvements in Beaters, of which the following is a description, reference being had to the accompanying drawings, which form a part of my specification.

My invention has for its object the provision of double driving mechanism more especially intended for use in connection with beaters and the like; the purpose of the invention being to provide mechanism whereby the requisite power will be obtained and as a result smooth and steady operation will be provided, namely a construction which may be easily manipulated and made substantially noiseless in its operation.

Another object of my invention is to provide a beater wherein all of the blades or beater elements will move in the same direction with a positive drive; the driving mechanism and beater elements given such construction as to adapt the beater for use in thick batter and the like.

A further object of my invention is to provide a beater wherein the blades or beater elements are adjustable or made expansible laterally to adapt the device to either shallow or deep batters and vessels; the blades being adapted to conform, more or less, to the bottoms and sides of mixing bowls of varying shapes; the blades or beater elements being adapted to spread or expand outwardly from the axis thereof and with a spaced relation between the respective correlated blades which tends to produce a better circulation of air or oxygen through the batter or matter operated on, tending to more quickly bring the article to a fluffy or foamy consistency than would otherwise be the case.

The above enumerated objects and advantages, as well as other advantages inherent in the construction, will be more readily comprehended from the detailed description of the accompanying drawings, wherein:—

Figure 1 is a perspective view of my improved beater.

Figure 2 is an inverted plan as viewed from the line 2—2 of Figure 1 looking in the direction of the arrows.

Figure 3 is a sectional view taken on the line 3—3 of Figure 1 looking in the direction of the arrows.

Figure 4 is a sectional view taken on the line 4—4 of Figure 1 looking in the direction of the arrows.

Figure 5 is a longitudinal sectional view of the beater illustrated in Figure 1.

Figure 6 is a detail view in perspective of the blade-adjusting mechanism.

Figure 7 is a detail sectional view taken on the line 7—7 of Figure 5 looking in the direction of the arrows.

Figure 8 is a detail sectional view taken on the line 8—8 of Figure 5.

Figure 9 is a fragmentary view of the lower portion of one-half of a beater element in side elevation; the shaft and other elements being broken away; said figure illustrating a modified form of blade construction.

Figure 10 is a detail perspective view of a portion of one of the blades or beater elements shown in Figure 9.

My invention in the specific exemplification is shown in the nature of a beater adapted for whipping cream, eggs, batter and the like, and comprises a rigid rod or shaft 15, the major portion whereof is preferably made rectangular in cross section, while the upper or driving mechanism receiving end is shown circular in cross section. The upper cylindrical end of the shaft or rod 15 is provided with a pair of pinions or star-wheels 16 and 17 arranged in spaced relation, namely with the pinion 16 disposed at the upper end of the shaft or rod 15, while the pinion 17 is arranged at an intermediate point, namely adjacent to the upper end of the squared portion of the rod, see Figure 5; both pinions being so secured to the rod or shaft 15 that rotation will be imparted to the latter when the pinions are rotated. The upper end of the shaft or rod is disposed through a suitable frame preferably of the skeleton or open formation shown and consisting of a strip of sheet metal bent so as to provide the substantially parallel disposed portions 18 apertured for the passage of the shaft or rod 15 and disposed intermediate of the pinions 16 and 17; the strip of metal being disposed upwardly on one side of the rod or shaft 15, as shown at 19, with an intermediate portion thereof preferably bent so as to provide the part 20 disposed tangentially to the axis of the shaft 15 for a purpose later to be described. The ends 18 of the frame are shown secured together by means of a plate 21 which is shown with one end bent at right angles thereto and apertured for the passage of the shaft; the bent end maintaining the pinion 17 in place, while the upper end of the plate 21 has a suitable handle 22 secured thereto; the handle being preferably disposed at right angles to the rod or drive shaft 15, as clearly shown in Figure 5.

Pivotally mounted at 23 on the portion 20 of the frame 19 is a suitable bracket 24 which carries an internal toothed wheel or gear 25 which is arranged at an acute angle to the longitudinal axis of the rod or shaft 15 and disposed on opposite sides thereof so as to mesh, at diametrically opposite points, with both pinions 16 and 17, but with the pinions 16 and 17 disposed on opposite sides of the internal gear 25 in order that both pinions will be driven in the same direction; the construction providing a double drive whereby increased power will be obtained and increased speed will be given to the shaft or rod 15 in a manner substantially equivalent to that resulting from pinions provided with double the amount or a greater number of teeth. The bracket member 24 is shown preferably provided with an extension 26 to which is secured a suitable handle 27 whereby the bracket 24 with the internal toothed gear 25 may be rotated about the pivotal point 23. With the carrier or bracket 24 secured to the toothed gear 25 at diametrically opposite points as shown, it is apparent that the gear 25 will be firmly held in proper relation with the pinion 16 and 17 and constant mesh between gear 25 and the pinions 16 and 17 ensured. The opposite ends of the plate 21 are preferably bent or formed to be in close relation with the side of the internal toothed gear 25 and thus prevent sidewise movement or flexing of the gear toward the plate 21 by reason of any lateral pressure that may be applied by means of the handle 27 to the bracket 24 during operation. As shown in Figure 5, the rod or shaft 15 is disposed through the gear 25 substantially at the center or axis thereof in a tangential manner; the construction providing a double drive for the rod or shaft.

The lower end of the shaft or rod 15 is provided with a small plate 28 attached to the shaft so as to rotate therewith and this plate 28 provides an attaching point for the central or bowed portions of the beater elements 29 which are preferably composed of flat strips of metal or sheet steel arranged in pairs, with the two pairs disposed at right angles to each other so that both strands or portions of the blades of one pair will be spaced substantially ninety degrees from the blades of the other pair, as clearly shown in Figures 1, 2 and 3. The blades 29 of each pair are spaced at equal distances apart throughout the entire length of the blades, with the ends of the respective blades preferably brought into juxtaposition and secured in slots or in any suitable manner in a disc or circular plate 29 disposed about the shaft or rod 15, see Figures 5 and 4. The plate 28 is formed so as to provide projections 30 of width commensurate with the distance intermediate of the blades of each pair and these projections 30 may then be bent across the top of the bowed portion of the blade adjacent thereto as shown in Figures 1 and 3; each projection 30 being preferably provided with a pair of upstanding lips or lugs 31 so as to provide a guard or spacer for the blades of each pair when the latter are in the maximum contracted condition shown in Figure 1 and in full lines in Figure 5, at which time the bowed portion of each spring, at a distance slightly removed from the immediate center of the bowed portion, curves somewhat upwardly and therefore away from the projected sides of the plate 28. One pair of blade members 29$^a$ are located within the other pair of blade members 29 but have their ends disposed outside of the ends of the pair of blades 29, as shown at 32; the ends of all of the blade members being secured in the plate or disc 28$^a$ in any suitable manner, as for example by welding the same in suitable slots formed in the plate member 28$^a$ or by passing them through the slots and fastening the ends against withdrawal from the slots. The disc or plate member 28$^a$ is shown seated within the cup portion 33 of a sleeve member 34 which is square in cross-section to fit the squared portion of the rod or shaft 15; it being understood that the disc or plate member 28$^a$ is likewise provided with a squared opening so that it may slide on the squared portion of the rod or shaft 15. The sleeve portion 34 is shown provided with a pair of spaced lugs or ears 35, see Figure 6, between which is pivotally mounted a dog or finger latch 36 which is controlled by a suitable spring, as for example the flat spring 37, one end whereof bears against the sleeve 34 while the other end may be disposed intermediate of the pivot point 38 and the dog 36, as shown in Figure 5.

The rod or shaft 15, along one of its longitudinal sides, is shown provided with a number of notches 39 adapted to receive the end of the dog 36, when the sleeve member 34 is slid lengthwise of the rod or shaft; the notches 39 receiving the end of the dog 36 which is forced toward the shaft or rod 15 by means of the spring 37. With the dog inserted in one of the notches, it is apparent that the sleeve 34 with its cap portion 33 and therefore also the disc or plate 28ª will be held at the adjusted point on the rod or shaft 15, with the result that the blades 29 may either be in the maximum contracted position indicated in full lines in Figure 5, or the maximum distended or expanded condition shown in dotted lines in Figure 5, or in a number of intermediate positions obtainable by engagement by the dog 36 with any one of the notches 39 intermediate of the extreme end notches.

When the blades are in the contracted oblong condition shown in full lines in Figure 5, the beater is especially adapted for deep vessels or for deep batters and the like and the two part beater sections, consisting of blades arranged in pairs and in parallel juxtaposition, produce the action of the tines of a fork, causing the matter to ride up about the curved portions of the blades and inducing a proper circulation of air through the mixture. Where it is desired to beat or whip cream or an egg in a shallow vessel, the blades are adjusted so as to spread out, either into the maximum spread condition shown in dotted lines in Figure 5 or in a position intermediate of the maximum spread condition and the maximum contracted condition shown in full lines; that is to say, the blades are expanded to more or less conform to the bottom and sides of the mixing vessel or bowl, with the result that a greater beating or whipping surface is provided.

With my improved adjustable beater, the material operated on is more quickly whipped or brought into proper condition, as it has been found in practice that when the blades are expanded, as for example shown in dotted lines, the material is first whipped or acted upon by the lower portions of the blades and is caused to move upward adjacent the outer orbit of the expanded blades and therefore is caused to be operated on or whipped by the upper and intermediate portions of the blades, with the result that in the expanded condition illustrated for example in dotted lines in Figure 5 the beater will operate and whip the material into proper condition faster than has heretofore been accomplished, as my improved beater in reality presents the equivalent of sixteen tines or prongs to the material when the beater is adjusted as shown in dotted lines in Figure 5, as it is apparent that a pair of prongs are presented on opposite sides of the rod or shaft 15, with each pair substantially ninety degrees apart; it being evident therefore that the immediate bottom of the beater presents the equivalent of eight tines or prongs, which number is duplicated at the upper part of the blade portion of the beater. As a result of the construction, the material is subjected to a large number of spaced elements or blades, wherein the speed at the outer circumference or orbit is materially greater than the speed adjacent the shaft or rod, namely at a point where speed is necessary because of the tendency of the material to move toward the sides of the bowl or vessel.

By arranging the handle to one side of the longitudinal axis of the beater, it is apparent that a better vision is provided for the operator, especially when taken from a point above the beater as is frequently the case. The bottom of the rod or shaft 15 is preferably brought to a point and disposed slightly below the plate 28 so as to remove the bottom of the blades a slight distance from the bottom of the vessel.

In Figures 9 and 10, I illustrate a modified form of the beater elements indicated at 40; the elements, like in the previously described construction, being formed of strips of sheet metal. I merely disclose a portion of the blades or beater elements in Figure 9, wherein the lower intermediate portion of each strip or blade 40 is provided with depressed or outwardly pressed portions as at 41; which extend beyond the main flat sides or surfaces of the blades so as to provide the engrailed or concavo-convex portions as clearly shown in Figure 10; the bending of said portions 41 being made possible by providing the longitudinally disposed slits 42 at predetermined distances apart, longitudinally, which permit the portions intermediate of the ends of the slits, and preferably on what may be termed the outer sides or edges of the blades or beater elements, to be pressed or bowed outwardly toward what would constitute the lower sides of the blades as clearly shown in Figure 9. These bowed portions are preferably arranged merely throughout the intermediate portions of the different blades, namely throughout the portion which may contact with the bottom of the bowl or dish containing the ingredient which it is intended to agitate. As is apparent from the construction, the bowed or bent portions 41 will extend into a plane substantially equal to or parallel with the lower end of the beater-spindle or shaft and therefore into close proximity or immediate contact with the bottom of the bowl or dish, with the result that a very minute quantity of batter or other ingredients may be lifted up and readily agitated. In this construction the portions of the blades provided with the engrailment or bowed portions in reality each present a plurality of take-up edges; namely what may be called the normal edge of the beater or blade and the edge of the engrailed or bowed portion; the material being permitted to pass through the space or slot intervening the bowed portion and the normal or main part of each blade or strip as is clearly evident from Figures 9 and 10. Of course, if desired, the entire blade may be constructed as just described, but as the object is to provide a beater adapted to agitate the matter on the bottom of a shallow dish, I have merely shown the lower or what has been termed the intermediate portion of the blade provided with the concaved depressions as described.

The construction shown and described I believe to be the best embodiments of my invention, with my improved driving mechanism for the purpose of exemplification, being shown applied to a beater-shaft; the terms and expressions merely being used as terms of description and not of limitation, because there is no intention in the use of such terms and expressions to exclude mechanical equivalents for the respective features shown and described, as certain structural modifications are possible and may be made without, however, departing from the spirit of my invention.

What I claim is:—

1. In a device of the character described, a shaft, means whereby the shaft may be rotated, blade members arranged in pairs and spaced relation, said blade members being composed of strips of flexible sheet metal bent into loop form, with the intermediate portions of said blade members immovably secured adjacent the end of the shaft, means, slidable on said shaft, to which the ends of said blade members are secured, and means whereby the second mentioned means with the blade members may be locked in adjusted position lengthwise of said shaft.

2. In a device of the character described, a rotatably mounted shaft, beater members consisting of flat spring steel strips arranged in pairs and spaced relation, with the pairs disposed at an angle to each other, the respective blades being immovably secured at an intermediate point to said shaft, a sleeve member slidable on the shaft and adapted to receive the ends of the blade members, and means whereby the sleeve member may be locked at various points on the shaft, whereby said blade members may be placed in contracted or expanded condition.

3. In a device of the character described, a rotatable shaft, a disc or plate secured to the end of the shaft, a plurality of spring blades arranged in pairs and secured at an intermediate point to said disc or plate whereby the blades are caused to move with the shaft and maintained in predetermined spaced relation, while the ends of each blade are brought into juxtaposition, a sleeve member slidable on the shaft and formed to receive the ends of all of said blades, and spring-controlled means carried by the sleeve member whereby the latter with the blades may be locked in adjusted position at predetermined points on the shaft.

4. In a device of the character described, a rotatable shaft, beater elements composed of strips of flexible metal bent so as to bring the ends of each strip into juxtaposition, means, slidable on said shaft, whereby the ends of the strips are held in place, said beater elements being arranged in pairs and in spaced relation, with the beater elements of one pair disposed at an angle to the beater elements of the other pair, means whereby the intermediate bowed portions of the respective beater elements are secured to the end of the shaft and the spaced relation between the elements maintained, and driving mechanism operatively connected with the shaft for rotating the latter with said beater elements.

5. In a device of the character described, a rotatable shaft, beater elements composed of flexible strips of metal bowed so as to bring the ends of each strip into juxtaposition, said elements being arranged in pairs and in spaced relation, one pair being arranged within the other and disposed transversely thereof with the ends of the strips of said inner pair arranged to the outside of the ends of the strips of the outer pair of elements, the intermediate or bowed portions of said elements being operatively secured to the lower end of said shaft, means secured to the ends of said strips and slidable on said shaft whereby the ends of the strips may be moved toward or away from the lower end of the shaft and the beater elements thereby distended or contracted, and driving means operatively connected with the upper end of the shaft for rotating the latter with said beater elements.

6. A device of the character described, comprising a rotatable shaft, beater elements composed of flexible metallic strips bowed into loop form, with the portions of the strips intermediate of the ends being secured adjacent to the lower end of the shaft against movement so as to rotate therewith, while the ends of the strips are bowed upwardly into juxtaposition with the shaft, and means secured to the ends of the strips and slidable on the shaft whereby the ends of the strips may be moved in directions lengthwise of the shaft and the beater elements thereby distended or contracted.

7. A device of the character described, comprising a rotatable shaft, beater elements composed of bowed metallic strips secured to the shaft to rotate therewith, the intermediate or bowed portions of the strips being disposed adjacent to the bottom of the shaft, said strips at the intermediate portions being slit longitudinally and portions thereof adjacent to said slits bowed outwardly to provide passages between the main portions of the strips and said bowed portions, thereby providing said portion of each strip with a plurality of agitating surfaces.

8. A device of the character described, comprising a rotatable shaft, a beater portion composed of a plurality of metallic strips bent so as to bring the ends of the strips adjacent the sides of the shaft while the intermediate or bowed portion of each strip is secured to the shaft to rotate therewith, one longitudinal edge of each strip being engrailed to provide portions of the strip disposed in a different plane from that of the main part of the strip, and means whereby the shaft may be rotated.

9. In a device of the character described, an operating shaft, a plurality of blades arranged in groups, with the blades of the respective groups disposed in parallel spaced relation, the blades being formed of strips of sheet metal bowed so that portions of the blades will extend laterally outwardly, in substantially the same plane, from the shaft to a comparatively great extent, while the major orbit described by the blades will be in proximity to the lower end of the shaft, and means for rotating the shaft.

GEORGE J. FITZPATRICK.

Witnesses:
G. HEIDMAN,
F. A. FLORELL.